UNITED STATES PATENT OFFICE.

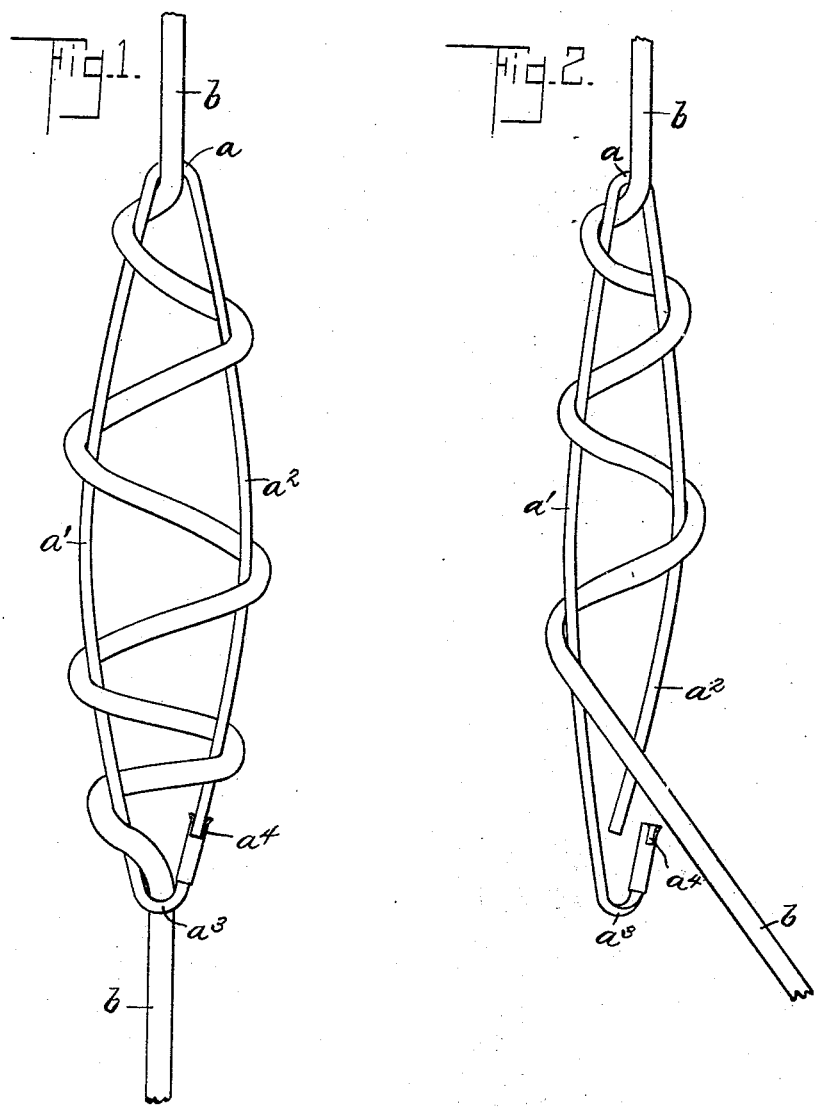

DAVID M. CARR, OF ROCHESTER, NEW YORK.

CORD-ADJUSTER.

SPECIFICATION forming part of Letters Patent No. 710,666, dated October 7, 1902.

Application filed August 8, 1901. Serial No. 71,344. (No model.)

*To all whom it may concern:*

Be it known that I, DAVID M. CARR, a citizen of the United States, and a resident of Rochester, in the county of Monroe and State of New York, have invented certain new and useful Improvements in Cord-Adjusters, of which the following is a specification.

This invention relates to cord-adjusters, and is particularly useful in connection with electrical conductor-cords.

It consists in the devices hereinafter described and claimed.

In the drawings, Figure 1 shows a form of this invention with the parts in one position, and Fig. 2 shows the same device with the parts in another position while the cord is being adjusted thereon.

The device consists in an elongated frame, preferably made of a single piece of spring-wire—as, for instance, of brass or steel—so as to be continous and having a single side opening thereinto through which a cord may be passed. One end $a$ of the frame is curved into a form adapted to fit around the cord $b$. From the curved portion $a$ extend the two sides wires $a'$ $a^2$. The lower portion of the side wire $a'$ is curved back upon itself, as shown at $a^3$, and its end is provided with a suitable socket $a^4$ for the end of the wire $a^2$. This socket may either be formed in the continuous wire $a'$ or may be a socket separately made and fastened upon the end thereof. The side wire $a^2$ is bent, so that when resting in the socket $a^4$ it is held therein by the spring-pressure of the wire and when removed from the socket $a^4$ is adapted to spring away therefrom, as shown in Fig. 2, in order that the cord may be inserted through the opening thus made.

I prefer the form of device shown in the figures, which is substantially an oval, with a long major axis and a short minor axis. For conductor-cords the end curves $a$ $a^3$ preferably should not bind thereon. In order to apply the cord to this form of the invention, the end of the wire $a^2$ is removed from the socket $a^4$ and by its natural spring leaves an opening or entrance into the interior of the oval. The conductor $b$ is then placed within the oval through the opening, (if it has no free end,) and the conductor-cord is then wound around the arms $a'$ $a^2$, preferably, as shown in the drawings, by a kind of figure-8 winding—that is to say, the cord is wound around the outside of the wire $a'$, is then passed through the opening around the end of the wire $a^2$, then around the outside of the wire $a^2$, then through said opening, then around the outside of the wire $a'$, and so on until a sufficient amount of the cord has been wound upon the frame to shorten the cord to the desired degree. Then the cord is passed through the opening, and the end of the wire $a^2$ is sprung into the socket $a^4$. If now the portions of the cord outside of the adjuster are pulled, the cord will rest in the short curves $a$ $a^2$, and the device will hang vertically, as shown.

If the cord has been shortened too much, the wire $a^2$ is released from its socket and a sufficient number of coils of the cord are unwound through the opening in the frame. The wire $a^2$ is snapped back into its socket, and the device is ready again.

This device is useful for shortening and lengthening cords of incandescent lights, switchboard-cords, and also cords not used for electrical conductors.

It is obvious that the form of the frame need not be that of the elongated oval shown in the figures, but that any continuous wire frame having an opening thereinto whereby the cord may be passed into it is of my invention. So, too, the device may be used, as shown in Fig. 2, without employing the socket $a^4$, because if the wire of which the frame is made is stiff enough the pull of the cord will not contract it and the opening into the interior of the loop may be permanent.

What I claim is—

1. In a cord-adjuster, a continuous frame having a single side opening thereinto through which a cord may be passed, and means for closing said opening, substantially as described.

2. In a cord-adjuster, a frame formed of a single piece of suitable material and having the short curved end sections $a$, $a^3$, the long side portions $a'$, $a^2$, and an opening in one of said side portions through which a cord may be passed and produced by separating the ends of said single piece of material, substantially as described.

3. In a cord-adjuster, a frame formed of a single piece of suitable material, and having the curved end sections $a$, $a^3$, the side portions $a'$, $a^2$, and an opening adjacent to one of the end sections through which a cord may be passed, and means for closing said opening, substantially as described.

4. In a cord-adjuster, a frame consisting of a single piece of wire having the end sections $a$, $a^3$, the side wires $a'$, $a^2$, and a socket $a^4$ on one of said wires for retaining the end of the other wire, whereby an opening may be formed for the passage of a cord into the interior of the frame, substantially as described.

5. In a cord-adjuster, a frame consisting of a single piece of wire of elongated oval form and having, adjacent to one of the ends of the oval, means for connecting the ends of the wire, whereby when disconnected an opening is formed into the interior of the frame for the passage of a cord thereinto, substantially as described.

DAVID M. CARR.

Witnesses:
NELSON E. SPENCER,
F. BISSELL.